US007928665B2

(12) United States Patent
Olson et al.

(10) Patent No.: US 7,928,665 B2
(45) Date of Patent: Apr. 19, 2011

(54) SYSTEM AND METHODS FOR DIMMING A HIGH PRESSURE ARC LAMP

(75) Inventors: Scot Olson, Scottsdale, AZ (US); Bruce Pitman, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 827 days.

(21) Appl. No.: 11/831,345

(22) Filed: Jul. 31, 2007

(65) Prior Publication Data

US 2008/0036399 A1 Feb. 14, 2008

Related U.S. Application Data

(63) Continuation-in-part of application No. 11/695,216, filed on Apr. 2, 2007, now Pat. No. 7,436,129, and a continuation-in-part of application No. 10/788,895, filed on Feb. 27, 2004, now Pat. No. 7,312,780.

(51) Int. Cl.
*G01F 1/00* (2006.01)

(52) U.S. Cl. ......................... 315/291; 315/307; 315/224

(58) Field of Classification Search ............. 315/209 R, 315/224, 225, 291, 307, 211, 212, 246, 247, 315/274–289, 308–311
See application file for complete search history.

(56) References Cited

U.S. PATENT DOCUMENTS

| | | | | |
|---|---|---|---|---|
| 4,959,594 | A | 9/1990 | Ruby | |
| 4,998,045 | A | 3/1991 | Ruby | |
| 5,027,034 | A | 6/1991 | Ruby et al. | |
| 5,612,593 | A | 3/1997 | Olson | |
| 5,754,013 | A | 5/1998 | Praiswater | |
| 5,894,394 | A | 4/1999 | Baba et al. | |
| 6,118,415 | A * | 9/2000 | Olson | 345/41 |
| 6,222,709 | B1 | 4/2001 | Baba | |
| 6,515,882 | B2 * | 2/2003 | Moriguchi et al. | 363/97 |
| 6,566,821 | B2 * | 5/2003 | Nakatsuka et al. | 315/209 PZ |
| 6,947,024 | B2 | 9/2005 | Lee et al. | |
| 7,055,962 | B2 * | 6/2006 | Schwartz et al. | 353/85 |
| 7,436,129 | B2 * | 10/2008 | Olson | 315/291 |
| 2002/0121865 | A1 | 9/2002 | Nakatsuka et al. | |

* cited by examiner

*Primary Examiner* — Jacob Y Choi
*Assistant Examiner* — Jimmy T Vu
(74) *Attorney, Agent, or Firm* — Ingrassia Fisher & Lorenz, P.C.

(57) ABSTRACT

A driver circuit provides a drive current from a power source to an arc lamp to produce a light. The circuit includes a transformer having primary and secondary windings, with the ends of the secondary winding providing the lamp drive current to the arc lamp. A current steering module provides a drive output from the power source to the transformer in response to a current steering input, and a current control loop adjusts the current steering input in response to the current in one of the windings of the transformer. A luminance control loop adjusts the current steering input in response to the brightness of the light and a luminance command. A power control module may be further provided to generate a boost command in response to a difference between the brightness of the arc lamp and a luminance command.

20 Claims, 4 Drawing Sheets

SYSTEM AND METHODS FOR DIMMING A HIGH PRESSURE ARC LAMP

PRIORITY CLAIM

This is a continuation-in-part of application Ser. No. 11/695,216 entitled "TRIPLE-LOOP FLUORESCENT LAMP DRIVER" filed on Apr. 2, 2007, which is a continuation-in-part of application Ser. No. 10/788,895 entitled "FLUORESCENT LAMP DRIVER SYSTEM" filed Feb. 27, 2004. Both of these applications are incorporated herein by reference.

TECHNICAL FIELD

The present disclosure generally relates to high-pressure arc lamps, and more particularly relates to techniques and structures for managing the dimming of high pressure arc lamp assemblies such as those used in projection-type displays.

BACKGROUND

An arc lamp is any light source in which an electric arc produces visible light. Typically, arc lamps include a glass tube that is filled with light-emitting materials such as argon, mercury, sodium or other inert gas. When an electric potential is applied between two electrodes inserted into the tube, the resultant electric arc breaks down the gaseous materials and produces an ongoing plasma discharge that results in visible light.

Arc lamps have provided lighting in numerous home, business and industrial settings for many years. More recently, arc lamps have been used as backlights in liquid crystal displays such as those used in computer displays, cockpit avionics, flat panel televisions and the like. Such displays typically include any number of pixels arrayed in front of a relatively flat light source. By controlling the light passing from the backlight through each pixel, color or monochrome images can be produced in a manner that is relatively efficient in terms of physical space and electrical power consumption.

Despite the widespread adoption of displays and other products that incorporate arc light sources, however, designers continually aspire to improve the performance of the light source, as well as the overall performance of the display. In particular, the nature of many arc lamps can lead to difficulties in dimming the brightness of the lamp. As a result, most arc lamps are presently dimmed through the use of external "iris" type shrouding, rather than through control of the electrical drive signals applied to the lamp itself.

Accordingly, it is desirable to provide devices and techniques for effectively and efficiently controlling the brightness of various arc lamps and arc lamp displays. Other desirable features and characteristics will become apparent from the subsequent detailed description of the invention and the appended claims, taken in conjunction with the accompanying drawings and this background of the invention.

BRIEF SUMMARY

According to various exemplary embodiments, a driver circuit provides a drive current from a power source to an arc lamp to produce a light. The circuit includes a transformer having primary and secondary windings, with the ends of the secondary winding providing the lamp drive current to the arc lamp. A current steering module provides a drive output from the power source to the transformer in response to a current steering input, and a current control loop adjusts the current steering input in response to the current in one of the windings of the transformer. A luminance control loop adjusts the current steering input in response to the brightness of the light and a luminance command. A power control module may be further provided to generate a boost command in response to a difference between the brightness of the arc lamp and a luminance command. The boost command may be provided to an adjustable power source and/or provided to a lamp interface to increase the drive voltage on the arc lamp under certain operating conditions. Other embodiments include display systems, circuits and modules of various configurations.

BRIEF DESCRIPTION OF THE DRAWINGS

The present invention will hereinafter be described in conjunction with the following drawing figures, wherein like numerals denote like elements.

DETAILED DESCRIPTION

The following detailed description of the invention is merely example in nature and is not intended to limit the invention or the application and uses of the invention. Furthermore, there is no intention to be bound by any theory presented in the preceding background of the invention or the following detailed description of the invention.

Figure 1:
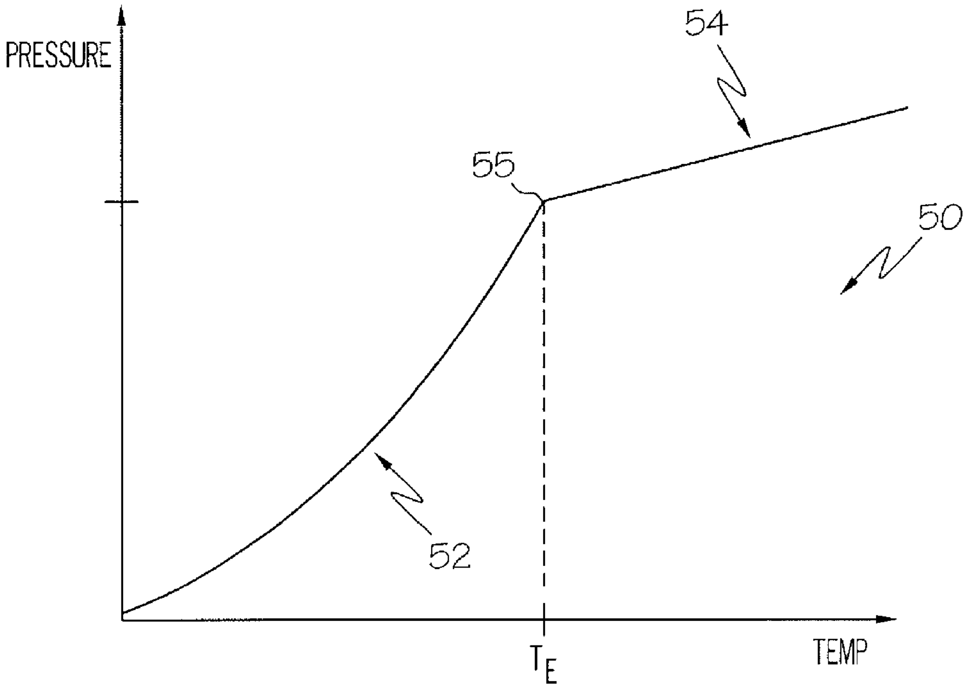
FIG. 1 is an exemplary plot of a temperature-pressure curve for an exemplary arc lamp.

With initial reference to FIG. 1, plot 50 shows a typical pressure versus temperature behavior of the light-producing materials (e.g. mercury) found within a conventional arc lamp bulb. Generally speaking, the light-producing materials behave as an ideal gas when the temperature is in excess of the material's boiling point. This portion of plot 50 is shown as section 54 to the right of transition point 55. To the left of transition point 55, the temperature is below the boiling point of the light-producing material, meaning that condensation can take place and droplets of liquid can form within the bulb. When condensation occurs, the pressure generally decreases exponentially with temperature, and this is shown as region 52 of plot 50. Point 55 on plot 50, then, corresponds to the point at which the light-producing material found within the internal chamber of the bulb remains in the gaseous state. Operation to the right of transition point 55 (corresponding to temperature greater than $T_E$) generally exhibits a linear pressure curve, whereas operation to the left of transition point 55 (corresponding to a temperature less than $T_E$) generally exhibits an exponential pressure curve.

In practice, as the voltage (and the associated electrical current) in a conventional arc lamp is reduced, the temperature of the bulb typically decreases, thereby producing changes in the thermodynamic pressure of the bulb. In most conventional lamps, reducing the brightness (i.e. dimming the lamp) is made significantly more complicated when the temperature of the lamp decreases to the left of transition point 55, where the temperature-pressure curve becomes non-linear. Moreover, if the temperature of the lamp becomes inordinately hot, certain materials (e.g. iodine) present in the lamp may form pools, which can reduce the level of light produced by the lamp or even eliminate light production entirely. Rather than attempting to dim the lamp through voltage control, then, most practical arc lamps are "dimmed" through the use of external shrouding rather than control of the voltage characteristics of the lamp itself. This external shrouding adds cost, bulk and design complexity to the cost of the overall lamp.

Through the use of a resonant multi-loop control circuit, however, the voltage characteristics of the arc lamp can be controlled with sufficient precision and accuracy that dimming can be achieved. Various resonant control systems are described, for example, in US Patent Publication 2005/0190167A1, which corresponds to the parent of this document, and is incorporated herein by reference. Other resonant control systems having additional features are described in U.S. application Ser. No. 11/695,216 entitled "TRIPLE-LOOP FLUORESCENT LAMP DRIVER" filed on Apr. 2, 2007, which is also a parent to this document and is incorporated herein by reference. The circuits and techniques described in these applications are readily applicable to both fluorescent and arc lamp bulbs, but in the case of arc lamp bulbs, various embodiments add an extra control to compensate for cases when the bulb becomes warm, which in turn can lead to pooling of iodine (or other materials), which in turn can reduce or eliminate the light produced by the bulb while the condition persists. To that end, an additional control module/circuit can be provided that identifies situations when an intensity command is present, but little or no light is produced by the lamp. In such instances, drive voltage provided to the lamp can be increased until light production resumes. The boost voltage to the lamp may be provided in any manner; in various exemplary embodiments, a control signal is provided to a variable power source to increase the supplied voltage/power under appropriate conditions. In other embodiments, modifications to the bulb interface allow additional boost voltage to be provided when appropriate. Other embodiments may include other features as appropriate.

Figure 2:
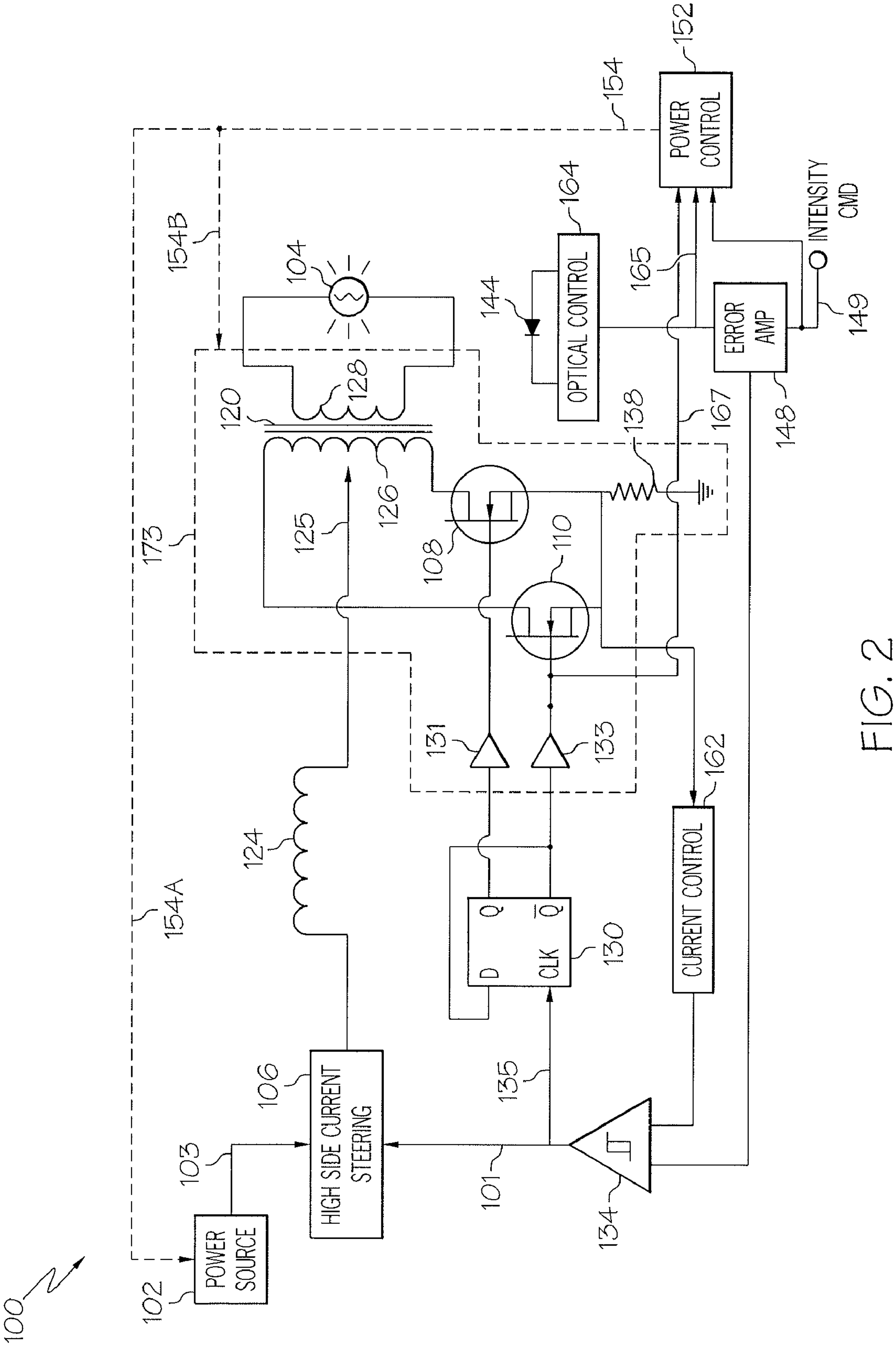
FIG. 2 is a block diagram of an exemplary control circuit for an arc lamp.

Referring now to FIG. 2, an exemplary lamp drive circuit 100 suitably delivers energy to a light-producing plasma in an arc lamp 104 in a resonant manner. The arrangement of circuitry shown in the figure has three fundamental control loops: a current control circuit 162, an optical feedback circuit 164, and a power control circuit 152. Power control 152 suitably provides a power command signal 154 to a power source 102, a lamp interface 173, or another component of circuit 100 to boost power to the lamp under certain operating conditions. When a luminance command 149 is provided, for example, and relatively little or no light is produced in response (as evidenced by signal 165 from optical control module 164), additional boost voltage can be commanded to the lamp 104, as described more fully below. This boost voltage can continue for any period of time, such as until luminous output from lamp 104 is detected or until normal operation of the lamp 104 can otherwise resume. In various embodiments, power control module 152 contains a timer or other delay feature that allows power boost command 154 to be asserted for a relatively limited period of time following detection of a boost condition. In other embodiments, power control module 152 receives any signal 167 that allows for detection of time. In the example shown in FIG. 2, signal 167 may be obtained from either the inverting or non-inverting outputs of low-side current steering module 130. This signal allows a counter or other structure within power control module 152 to determine a number of cycles that a boost command 154 has been asserted so that the command can be de-asserted at an appropriate time. In other embodiments, boost command 154 can remain asserted until sufficient light production resumes, as evidenced by signal 165. Additional detail about power control module 152 is provided below in conjunction with FIG. 3 and elsewhere, and other operating modes and features may be present in other embodiments as well.

Lamp driver 100 is appropriately designed to obtain input power 103 from a regulated, filtered power source 102, such as a battery or other reference source. Various embodiments of drive circuit 100 use a fairly tightly regulated input supply 102, while other embodiments will use an input supply that is controlled and variable so that voltage can be increased in response to a command 154A from the power control 152. Upon receipt of an appropriate command 154A, additional voltage 103 is provided to the current control portion of circuit 100 as appropriate. Although FIG. 2 shows the power 103 from source 102 being provided to a "high-side" current steering module 106 for convenience, in practice this additional power may be provided to any other circuitry in system 100, including any additional circuitry not shown in the exemplary figure. In embodiments wherein boost power is provided through signal 154A to power source 102, signal 154A may be formulated in any manner by circuitry 152 to provide appropriate digital and/or analog control to source 102.

The main arc drive circuitry 100 suitably includes at least a current control circuit 162 and an optical feedback circuit 164 that control lamp current and lamp luminance, respectively. The control signals resulting from circuits 162 and 164 are coupled to lamp 104 through any sort of appropriate lamp interface 173. As shown in FIG. 1, in one embodiment of interface 173 an arc transformer 120 with a center-tapped primary winding 126 is fed current through the center tap 125 by an inductor 124. Two switches (e.g. N-channel FETs or the like) 108, 110 drive the outer legs 112, 114 (respectively) of the primary winding 126 on the arc transformer 120 in an alternating fashion to provide an AC signal on the secondary winding 128. In this embodiment, a "high side" current steering module 106 suitably provides drive current to transformer 120 via an inductor 124 and/or any other circuitry as appropriate. The arc transformer secondary winding 128 is coupled to the two end terminals of arc lamp 104 as appropriate. Since the power FETs 108 and 110 in the arc drive each carry relatively high levels of current in the embodiment shown, a high-current driver 131 and 133 on the gate of each switch quickly transitions the FET through the linear region as it is commanded between off and on states, optimizing efficiency of the drive system.

Other lamp interfaces 173 may be provided in any number of equivalent embodiments. In various embodiments, interface 173 provides boost voltage in response to a signal 154B from power control 152. This boost voltage may be provided through slightly different arrangement of the windings of transformer 120, for example, or through a boost coil associated with transformer 120, or in any other manner. Additional detail about such embodiments is described below, particularly in conjunction with FIGS. 4-5.

In the embodiment shown in FIG. 2, source leads of the switches 108, 110 are shown connected together and through a current sense resistor 138 (e.g. a resistor of about 0.025-ohms or so) to signal return. Continuous current in sense resistor 138 is filtered and amplified in loop 162; this signal drives the positive input of a hysteretic comparator 134. The output of the hysteretic comparator in the FIG. 1 embodiment drives high side current steering circuit 106. This drive signal is shown in FIG. 1 as switch input signal 101, which may be filtered and/or otherwise adjusted by filter circuitry 105 as appropriate and desired for the particular embodiment.

The two N-channel FET drivers 108 and 110 are driven by signal 135, which in this embodiment is shown to coincide with drive signal 101. Signal 135 is provided as a clock input to a D flip-flop with latching output. D flip-flop operation ensures only one N-channel FET is on at any time. In operation, the rising (or trailing) edge of any pulse arriving on signal line 135 can shift the signal 137 provided at the data ("D") input of the device. In practice, signal 137 is provided from the inverting output ("$\overline{Q}$") of the same device, thereby providing that switched 108 and 110 should remain in opposite (i.e. activated or non-activated) states, and that the states of each switch 108, 110 should change on any rising edge of signal 135. As noted below, this same structure can receive an input 135 from other sources in circuit 100 to improve operation. Signal 135 can be obtained from the power switch 106, from inductor 124, from transformer 120 and/or for any other signal node existing between the voltage source 102 and lamp 104 as appropriate. Since flip-flop 130 in this embodiment is toggled by any rising voltage edge on signal 135, many equivalent input signals 135 could be provided. Additionally, flip-flop 130 could be equivalently replaced with a trailing edge flip-flop, with a conventional latch circuit, with discrete components configured to provide latching functions, and/or with any other logical or electrical equivalent as appropriate.

Current control loop 162 regulates the flow of current through the plasma in arc lamp 104 for a particular luminance desired to be produced from the lamp. The desired luminance is provided by an input drive signal 149 that is received from an external control source as appropriate. High-side current steering, controlled by a hysteretic comparator 134, maintains the level of current for the given light output by periodically or aperiodically refreshing the current control source (e.g. transformer 120) with power from power supply 102. Low-side current steering, also driven from the hysteretic comparator 134 in FIG. 1, determines the path excitation current flows in the current control circuitry 120 and lamp interface, and the direction that current flows within the lamp. Lamp current frequency can range from about 10 kHz to 100 kHz or more in this embodiment, depending on lamp characteristics, current control and lamp interface elements, current-loop voltage amplifier gain, comparator hysteresis, luminance level and/or other factors as appropriate. Current, after flowing through the plasma in lamp 104, returns to the lamp interface and current control circuitry 120, finally arriving back to the filtered input power source 102 after being measured, filtered, and/or otherwise processed as appropriate by current control circuit 162 before being presented to an input of hysteretic comparator 134.

Generated light suitably exits the lamp at an angle that may be approximately normal to the outside glass surface. Some of this light impinges on a photodiode, photosensor and/or other photon-to-current converter 144 that is coupled to the arc drive circuitry via optical feedback circuit 164. The optical feedback circuit 164 obtains an electrical signal from photon to current converter (e.g. photodetecting diode 144) that measures the luminous flux coming from the lamp 104, and that outputs a proportional electrical current. This current can then be converted to a voltage and provided to an input of an error amplifier 148 to produce an optical amplifier that has relatively high gain at low luminance and exponentially decreasing gain at high luminance. The logarithmic amplifier 146 helps control stability in the optical control loop when higher levels of luminance and power are desired. The error amplifier 148 in turn drives an input to the hysteretic converter 134 described above. Luminance command signals 149 to lamp driver 100 may be obtained and processed as appropriate.

The positive input terminal of the error amplifier 148 is generally maintained at or near zero (or some other reference) potential. The output of error amplifier 148 can be compared with the output of the current control loop amplifier 132 at hysteretic converter 134 as appropriate. This hybrid control arrangement causes the current control loop circuitry 162 to drive plasma in arc lamp 104, thereby generating an intensity of high-pressure arc light corresponding to a signal out of the optical amplifier 146 that has the effect of negating luminance commanded signals 149. Hysteretic comparator 134 thus couples the current control loop 162 with the optical feedback loop 164, and it is the complex interplay between the two loops and arc lamp 104 that determines the physical processes occurring with plasma in the lamp arc.

The effects of current control loop 162 and luminance control loop 164 therefore combine to produce a resonant drive signal 125 to transformer 120, which in turn provides a drive signal to lamp 104 that is determined as a function of drive signal 125 and the polarity of winding 126, which in turn is determined by the conducting or non-conducting states of switches 108 and 110.

In the embodiment shown in FIG. 2, the polarity of the voltage on winding 126 and the drive signal 125 are both determined in response to a common signal, since the input signal 135 used to toggle flip-flop 130 is effectively the same signal used to control the applied voltage at switch 106. In various embodiments, however, these two signals can be separated so that changes in polarity of the voltage on winding 126 are not directly related to the application of the drive signal. Stated another way, the polarity of the voltage across winding 126 can be adjusted at a different rate than the rate at which the drive signal 125 is changed. The polarity of the voltage across winding 126 can be toggled in response to the conditions within the lamp reflected back through transformer 120 to the primary side, for example, rather than from the input to switch 106. This can be accomplished in any manner, such as by obtaining input 135 to flip-flop 130 from an electrical node located between the output of high-side current steering module 106 and transformer 120. Because electrical effects of lamp 104 are reflected in signals propagating across transformer 120, obtaining the input to a low-side current control from the transformer 120 or signals coupled thereto can have the effect of adjusting the frequency of electrical current applied to the lamp in response to lamp operation. This concept may be generally referenced in the context of a "triple loop" driver circuit having a current control loop, a light intensity control loop and a drive control loop for ease of understanding. In practice, however, the concepts of a drive control loop may be implemented distinct from the current control and/or light intensity loops across a wide variety of alternate, yet equivalent, embodiments. Many other additional or alternate features may be provided in a wide range of alternate but equivalent embodiments.

In operation, power control circuit/module 152 suitably identifies "boost" conditions wherein little or no light is produced even though a luminance command 149 is present. Under such conditions, a boost command 154 is issued to a variable power source 102 or to any feature within lamp interface 173 to produce additional boost voltage until the condition subsides or normal operation can continue.

Figure 3:
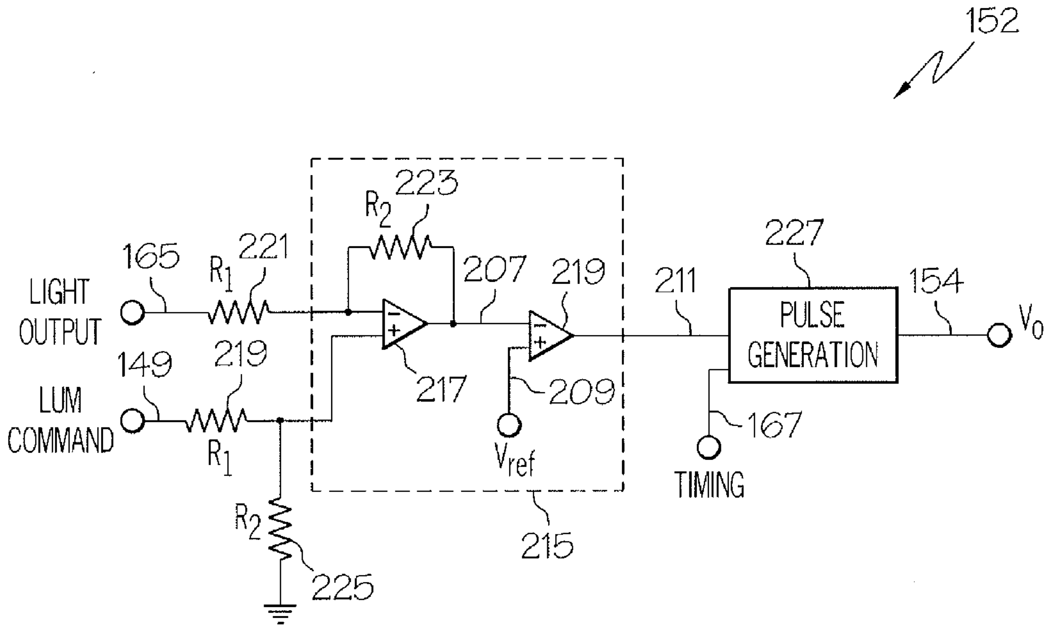
FIG. 3 is a circuit diagram of an exemplary power control module for an arc lamp driver circuit.

FIG. 3 is a circuit diagram of an exemplary power control circuit 152. As shown in FIG. 3, an exemplary power control module 152 suitably receives input signals 149 and 165, identifies boost conditions using a comparator feature 215, and generates an appropriate boost control output signal 154 using any sort of signal generation feature 227 as appropriate. As noted above, boost power is typically desired when a luminance command 149 directs the production of light, yet little or no light is resulting from the lamp 104, as evidenced in signal 165. Signal 165 may therefore be provided from any portion of detector 144 or optical control circuitry 164 as appropriate.

Received signals 149 and 165 may be scaled and processed in any manner. In various embodiments, signals 149 and/or 165 may be scaled using any sort of components, circuits or other features, such as any sort of conventional voltage divider, amplifier, attenuator and/or other circuitry. In still other embodiments, scaling may be omitted entirely if signals 149 and/or 165 are provided in an appropriate format and level for processing by comparator 215.

Comparator 215 is any circuit, module or other logic capable of determining when a boost condition exists. The comparator feature 215 is shown in FIG. 3 as a difference amplifier 217 configured in combination with a comparator amplifier 219, although other embodiments may implement the comparator feature 215 in any other manner. Components 219, 221, 223, 225 may be provided to bias the operation of comparator/operational amplifier 217 circuitry as desired. In the embodiment shown in FIG. 3, for example, resistors 219, 221, 223 and 225 are designed to provide an appropriate signal gain for amplifier 217. To that end, resistors 219 and 221 may be designed to be more or less equal in resistance, as may resistors 223 and 225 to simplify the design of circuit 152. In the embodiment shown in FIG. 3, amplifier 217 provides an output 207 that represents the difference in voltage between signals 149 and 165. Amplifier 219 then compares this difference 207 to any appropriate threshold level 209 to identify boost conditions with signal 211. Signal 211, then, indicates when the difference between the light commanded (signal 149) and the light produced (signal 165) exceeds an appropriate threshold 209, thereby indicating a need for boost voltage.

Signal generation feature 227 is any sort of circuit or other module capable of producing an appropriate boost command signal 154 in response to signal 211. In the exemplary embodiment shown in FIG. 3, signal generation feature 227 is a pulse generator circuit capable of producing a simple two-state signal that is asserted when a boost condition is present, and otherwise de-asserted. Other embodiments could use different signal representation or encoding schemes as desired.

When a boost command is asserted at signal 154, the command may persist for any period of time in any manner. In various embodiments, signal generation feature 227 latches or otherwise maintains signal 154 for a period of time to provide sufficient boost energy to lamp 104. Signal generation feature 227 may be designed to be responsive to a clock signal or any other timing signal 167 operating within system 100 (FIG. 2) or elsewhere that allows for effective determination of the boost time period. Signal 167 may be obtained from the low-side current steering function of system 100, for example, as described above. In such embodiments, boost signal 154 is maintained until a predetermined number of pulses (or other signals) are received. In other embodiments, signal generation feature 227 maintains an internal timing feature that clears signal 154 after an appropriate boost period has elapsed. In still other embodiments, the additional timing feature is eliminated, and boost signal 154 is simply maintained until light production resumes and/or reaches an appropriate level, as may be determined from input signal 165.

Figure 4:
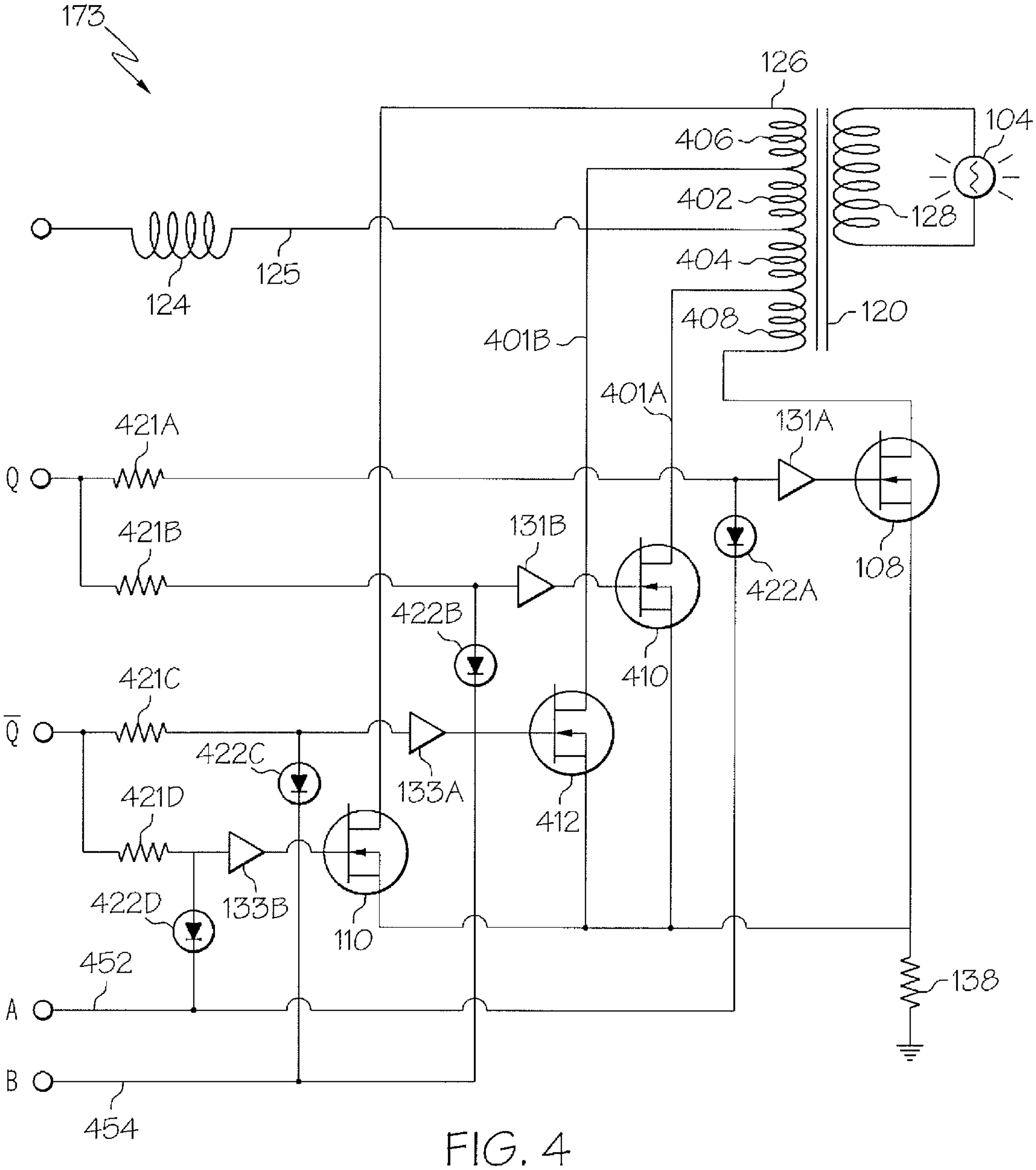
FIG. 4 is a circuit diagram of an exemplary lamp interface that provides boost voltage to an arc lamp.
Figure 5:
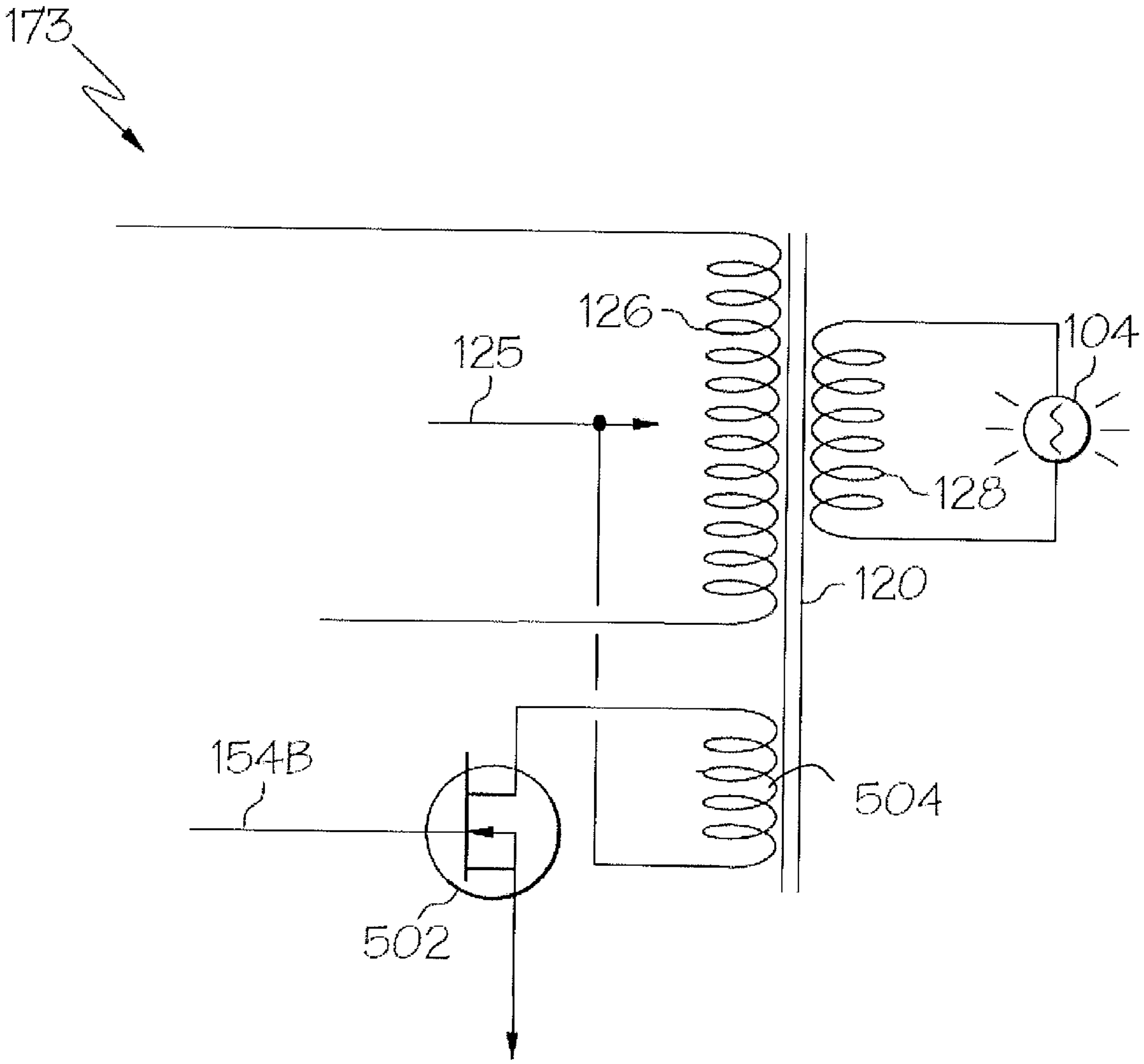
FIG. 5 is a circuit diagram of an alternate exemplary lamp interface that provides boost voltage to an arc lamp.

As noted above, boost command signal 154 may be provided as signal 154A to a variable power source 102, as signal 154B to lamp interface 173, and/or otherwise as appropriate. In embodiments wherein signal 154 is provided to lamp interface 173, additional voltage is typically provided to lamp 104 though the activation of "boost coils" in transformer 120. FIGS. 4 and 5 show two techniques for activating additional coils in interface 173 during boost conditions.

FIG. 4, for example, shows a primary winding 126 as described above that has two additional taps 401A and 401B that may be located, for example, on either side of center tap 125. These taps 401A, 401B may be activated by one or more transistors or other switches 410, 412 (respectively) during boost conditions to increase the turns ratio of transformer 120, and therefore increase the amount of voltage applied to lamp 104 from secondary coil 128. In the exemplary embodiment of FIG. 4, primary winding 126 of transformer 120 is configured with two inner coils 402, 404 and two outer coils 406, 408 all arranged in series. By using only the inner coils 402, 404, the turns ratio of transformer 120 can be increased during boost periods, thereby providing additional voltage to lamp 104 in comparison with periods in which the outer coils 406, 408 are also active.

Boost command signal 154B is used to trigger one or more switching gates to activate the desired coils at appropriate times. In the embodiment shown in FIG. 4, two command signals "A" 452 and "B" 454 are derived from boost command signal 154B in any manner to activate switches 108, 110, 410 and 412 as desired. Command signal 454 ("B"), for example, may correspond to the command signal 154B directly, with signal 452 ("A") corresponding to the logical opposite (inverse) of signal 154B. As shown in the figure, the outer coils 406, 408 are generally active when signal "A" 452 is asserted, and inner coils 402, 404 are generally active when signal "B" 454 is asserted. Diodes 422A-D and resistors 421A-D suitably ensure that drive signals "Q" and "$\overline{Q}$" applied by low-side current steering module 130 (FIG. 2) bypass switches 108, 410, 412 and 110 (respectively) when the switches are desired to be inactive. Conversely, when signal 452 is asserted, diodes 422A and 422D allow signals "Q" and "$\overline{Q}$" to be applied to switches 108 and 110 as appropriate to provide normal operation of interface 173. When signal 454 is asserted, boost operation is enabled by providing signals "Q" and "$\overline{Q}$" to switches 410 and 412, respectively, which in turn enables operation of transformer 120 using inner coils 402 and 404.

Other drive circuits or other interface arrangements could be formulated in any number of equivalent embodiments. FIG. 5, for example, shows an alternate technique whereby a separate boost coil 504 is provided on the primary side of transformer 120. The boost coil 504 is appropriately coupled to a transistor or other switch 502 that allows activation of coil 504 during appropriate times. Other techniques for modifying the interface 173 to lamp 104 may be formulated in a wide array of equivalent embodiments.

While at least one example embodiment has been presented in the foregoing detailed description of the invention, it should be appreciated that a vast number of variations exist. It should also be appreciated that the example embodiment or example embodiments are only examples, and are not intended to limit the scope, applicability, or configuration of the invention in any way. Rather, the foregoing detailed description will provide a convenient road map for implementing an example embodiment of the invention. It should be understood that various changes may be made in the function and arrangement of elements described in an example embodiment without departing from the scope of the invention as set forth in the appended claims and their legal equivalents.

What is claimed is:

1. A driver circuit for providing a drive current from a power source to an arc lamp producing a light having a brightness, the circuit comprising:

a transformer having a primary winding and a secondary winding, wherein each of the primary and secondary windings have a first and a second end and are configured to conduct an electrical current having a polarity, and wherein the ends of the secondary winding are coupled to provide the lamp drive current to the arc lamp;

a current steering module configured to provide a drive output from the power source to the transformer in response to a current steering input;

a current control loop configured to adjust the current steering input in response to the current in one of the windings of the transformer;

a luminance control loop configured to adjust the current steering input in response to the brightness of the light; and a power control module coupled to the luminance control loop, wherein the power control module is configured to generate a boost command in response to a difference between the brightness of the light and a luminance command exceeding a threshold value.

2. The driver circuit of claim 1 wherein the boost command is applied separately from the current steering input.

3. The driver circuit of claim 2 wherein the lamp drive current provided to the arc lamp is increased in response to the boost command.

4. The driver circuit of claim 2 wherein the boost command is applied directly to the power source to adjust the power provided in response thereto.

5. The driver circuit of claim 2 wherein the boost command is provided to the transformer to adjust a ratio of primary to secondary windings.

6. The driver circuit of claim 2 wherein the boost command is provided to a boost coil adjacent the primary windings of the transformer.

7. The driver circuit of claim 1 further comprising:

a flip-flop having a clock input, a signal input, an inverting output, and a non-inverting output, and wherein the inverting input is coupled to the signal input;

a first switch coupled to the inverting input, to a reference voltage, and to the first end of the primary winding; and a second switch coupled to the non-inverting input, to the reference voltage, and to the second end of the primary winding;

wherein the polarity of the primary winding is adjusted by toggling the first and second switches to thereby switchably couple the first and second ends of the primary winding, respectively, to the reference voltage.

8. The driver circuit of claim 7 wherein the power control module is coupled to receive an output from one of the first and second switches, and wherein the power control module is configured to discontinue the boost command after a limited period of time that is determined from the output received from the one of the first and second switches.

9. The driver circuit of claim 1 wherein the power control module is configured to discontinue the boost command after a limited period of time following detection of a boost condition.

10. A driver circuit for providing a drive current from a variable power source to a lamp producing a light having a brightness, the circuit comprising:

a transformer coupled to provide a drive voltage to the lamp;

a current steering module configured to provide a drive output from the power source to the transformer in response to a current steering input;

a current control loop configured to adjust the current steering input to the current steering module in response to the current in one of the windings of the transformer;

an optical feedback module configured to provide a signal that indicates the brightness of the light produced by the lamp;

a luminance control loop configured to adjust the current steering input to the current steering module in response to signal that indicates the brightness of the light; and a power control module configured to receive the signal that indicates the brightness of the light, to generate a boost command that initiates a boost in the drive voltage applied to the lamp when a difference between the brightness of the light and a commanded luminance exceeds a threshold value.

11. The driver circuit of claim 10 wherein the power control module is further configured to configured to discontinue the boost command after a limited period of time following detection of the difference between the brightness of the light and a commanded luminance exceeds a threshold value.

12. The driver circuit of claim 10 wherein the boost command initiates the boost in the drive voltage separately from the current steering input applied to the current steering module.

13. The driver circuit of claim 12 wherein the power source is a variable power source, and wherein the boost command is provided directly to the power source.

14. The driver circuit of claim 12 wherein the boost command is provided to the transformer to adjust a ratio of primary to secondary windings of the transformer.

15. The driver circuit of claim 12 wherein the boost command is provided to a boost coil adjacent a primary winding of the transformer.

16. A driver circuit for providing a drive current from a power source to a lamp producing a light having a brightness, the circuit comprising:

a transformer having a primary winding and a secondary winding, wherein the secondary winding is coupled to provide a drive voltage to the lamp;

a flip-flop having a clock input, a signal input, an inverting output, and a non-inverting output, and wherein the inverting input is coupled to the signal input;

a first switch coupled to the inverting input, to a reference voltage, and to the first end of the primary winding;

a second switch coupled to the non-inverting input, to the reference voltage, and to the second end of the primary winding, wherein the polarity of the primary winding is adjusted by toggling the first and second switches to thereby switchably couple the first and second ends of the primary winding, respectively, to the reference voltage;

a current steering module configured to provide a drive output from the power source to the transformer in response to a current steering input;

a current control loop configured to adjust the current steering input to the current steering module in response to the current in one of the windings of the transformer;

an optical feedback module configured to provide a signal that indicates the brightness of the light produced by the lamp;

a luminance control loop configured to adjust the current steering input to the current steering module in response to signal that indicates the brightness of the light; and a power control module configured to receive the signal that indicates the brightness of the light and to generate a boost command that initiates a boost in the drive voltage applied to the lamp when a difference between the brightness of the light and a commanded luminance exceeds a threshold value.

17. The driver circuit of claim 16 wherein the power source is a variable power source, and wherein the boost command is provided directly to the variable power source to boost the output of the variable power source.

18. The driver circuit of claim 16 wherein the boost command is provided to the transformer to adjust a ratio of primary to secondary windings of the transformer.

19. The driver circuit of claim 16 wherein the boost command is provided to a boost coil adjacent a primary winding of the transformer.

20. The driver circuit of claim 16 wherein the power control module is coupled to receive an output from one of the first and second switches, and wherein the power control module is configured to discontinue the boost command after a limited period of time that is determined from the output received from the one of the first and second switches.

* * * * *

UNITED STATES PATENT AND TRADEMARK OFFICE

CERTIFICATE OF CORRECTION

PATENT NO. : 7,928,665 B2
APPLICATION NO. : 11/831345
DATED : April 19, 2011
INVENTOR(S) : Olson et al.

It is certified that error appears in the above-identified patent and that said Letters Patent is hereby corrected as shown below:

Column 10, line 26, "configured to configured to" should be changed to --configured to--.

Signed and Sealed this
Sixth Day of September, 2011

David J. Kappos
*Director of the United States Patent and Trademark Office*